Patented Dec. 3, 1929

1,737,904

UNITED STATES PATENT OFFICE

GUSTAV A. WITTE, OF RIVERSIDE, CALIFORNIA, ASSIGNOR TO INTERNATIONAL PRECIPITATION COMPANY, OF LOS ANGELES, CALIFORNIA, A CORPORATION OF CALIFORNIA

CEMENTITIOUS PRODUCT AND METHOD OF MAKING THE SAME

No Drawing.   Application filed June 6, 1927. Serial No. 197,005.

This invention relates to cementitious materials and particularly to Portland cement, and to methods of making such materials.

The principal object of the invention is to provide a cementitious material having a high early strength but free from objectionable quick-setting properties when used in making concrete or the like.

It is well known that the early strength in concrete can be improved if the cement, such as Portland cement, is ground to a greater fineness than that of normal finished cement. It has been found, however, that such finely ground cement usually produces a quick-setting (and in some instances a flash setting) concrete, and as such is often not workable. It has in fact been found to be very difficult in actual plant operation to produce, by simply grinding all the cement to a finer state of division, a cement which will produce a concrete having the high early strength which is now so much in demand, without causing such concrete to set so rapidly as to prevent it from being worked satisfactorily.

I have found, however, that by grinding a portion of the cement to a materially finer state of subdivision than the normal cement, and then mixing this finely ground material, in suitable proportions, with cement ground to the ordinary fineness of normal finished cement, the resultant mixture possesses both high early strength and substantially normal setting time. In other words I have found that the early strength can be controlled by a fine grinding of a portion of the cement, and the setting time can be controlled by the use of a proper amount of cement of approximately normal fineness.

The product of my invention therefore comprises an intimate mixture of cement material ground to substantially the normal fineness of finished cement and a suitable proportion of similar cement material ground to a materially greater fineness than said first-named material before mixing therewith. The invention also comprises the method of making such product, such method consisting, in its preferred form, in grinding cement clinker to substantially the normal fineness of finished cement, separating a portion of such ground material from the remainder, grinding the separated portion to a materially finer state of division, and then intimately mixing this finely ground material with the remainder of the original ground material or with other cement of approximately normal fineness. This invention may be applied to any kind of cementitious material, but for the purpose of illustration I will describe its application particularly to Portland cement.

Ordinary finished Portland cement is in some cement mills commonly ground to a fineness of approximately 80 to 87% minus 200 mesh. In applying my invention to a cement of this type I have ground a portion thereof, or a portion of the clinker from which such cement was made, to a fineness of from 94 to 98% minus 200 mesh and have added this finely ground material to the normally ground cement in widely varying proportions in order to determine what proportion of finely ground material gave the best results, and have found that a cement consisting of an intimate mixture of from 2 to 3 parts of normally ground cement to one part of finely ground material of a fineness within the range given above, forms a concrete which has substantially a normal setting time and which at the same time gives a much higher early strength than does a concrete made from the normally ground cement. In fact concrete made with such mixtures shows approximately as great a breaking strength in three days as an ordinary concrete made from normally ground cement attains in seven days. As evidence of the effect both upon early strength and upon setting time, of finely grinding Portland cement, and of mixing suitable proportions of finely ground and normally ground cement in accordance with this invention, the following table is presented showing the average results obtained in a number of tests, as to fineness, setting time of neat cement and compressive strength on one to three cement-sand cylinders for the different materials designated, these tests having been made in accordance with American standard methods.

| Material | Fineness (% minus 200 mesh) | Setting time (hours and minutes) | | Compressive strength (pounds per square inch) 1:3 cement sand cylinders | | |
|---|---|---|---|---|---|---|
| | | Initial | Final | 3 days | 7 days | 28 days |
| 1. Normally ground cement. | 80–87% | 2:50–3:00 | 5:05–5:55 | 800–1,000 | 1,800–2,000 | 3,400–3,800 |
| 2. Finely ground cement. | 94–98% | Flash. | Flash. | Set too quick to make test pieces. | | |
| 3. Mixture of 3 parts #1 and 1 part #2. | 89–91% | 2:30–3:00 | 5:00–6:30 | 1,800–2,200 | 2,800–3,200 | 3,600–4,000 |

It is seen from the above table that the finely ground cement alone gave a flash set and that when an attempt was made to prepare test pieces therefrom for determining the compressive strength the material set too quickly to permit forming of the test pieces. A mixture, however, of three parts of normally ground cement with one part of the finely ground material not only gave approximately the same initial and final set as the normally ground material, but also showed a compressive strength very much in excess of the normally ground material. Tests have also shown that merely grinding all of the cement to a fineness of 89–91% minus 200 mesh does not give anything like the early compressive strength obtained by the above described mixture (material No. 3 of the table) having this same fineness as expressed by percent minus 200 mesh, and attempts to obtain high early strength cement by grinding all the cement to greater fineness than this have almost invariably produced cements which had a marked tendency to "flash" set or to set too quickly for compliance with commercial specifications.

In making the above-described Portland cement, part of the clinker may be ground to substantially the normal fineness of finished Portland cement, or say to any fineness below 90% through 200 mesh, for example to about 80–87% as in the above table, while another part of the clinker (or a portion of the material ground to normal fineness as above) may be ground to a fineness materially greater than normal fineness, or to materially in excess of 90% through 200 mesh, for example 94–98% as in the above table, and these two portions may then be intimately mixed together in suitable proportions, and preferably in the ratio of from 2 to 6 parts of the normally ground cement to 1 part of the finely ground cement. The mixing may be effected in any suitable or well-known mixing device, for example in a rotary mixer, or by feeding the two materials together through a cut flight conveyor.

I am unable to state with certainty why this mixture of finely ground and normally ground material produces this advantageous effect of combined high early strength and normal setting time, but the experiments which I have made indicate that it may be due to a more advantageous proportioning of the different sizes of particles obtained by this method than can be obtained by simply grinding all of the material to the same fineness.

The advantageous properties of this cement may also be explained by a consideration of the fact that when cement is ground to greater than normal fineness, harder and harder particles are continually reduced to a state of fine division. In "Portland Cement" by Richard K. Meade, third edition, published 1926 by the Chemical Publishing Company, it is stated on page 581 that in the author's opinion the reason why fine grinding of cement causes quick setting is that it causes harder particles of material to be reduced to a fine state of division, "and these harder portions are probably responsible for the 'quick set' of finely ground cement, owing to the fact that they are low in lime and are burned to a high degree of vitrification." He also states that "if the finer particles of cement, not merely the particles which pass a number 200 sieve but the impalpable dust are separated from the cement, it will usually be found that this very fine material sets normally, showing that it is possible to grind some part of the cement at least to an impalpable powder. It is also now generally agreed that it is this fine powder which is the active constituent in cement." If these statements are true then the superiority of my improved cement may be due to the fact that by only grinding to a fine state of division a certain definite portion of the cement, the total amount of this harder, low lime material which is brought to a fine state of division is limited and the quick set is thus prevented, while by grinding this portion sufficiently fine a large enough amount of "flour" or impalpable powder is produced to give the necessary high early strength even when admixed with a larger portion of normally ground cement.

In some cases, in order to increase the effect mentioned above, the portion of normally ground cement which is to be more finely ground may be separated therefrom by screening or by air blowing methods, so as to separate only the finer portions therefrom and leave substantially all of the coarser portions, containing the hard low lime particles, with the main portion of the normally ground cement. Under this method of procedure the clinker may all be ground to a suitable fineness, for example to a fineness of 80–90% through 200 mesh and then all or preferably a part of such material may be subjected to a separating operation to remove therefrom a suitable proportion of material having a higher proportion of fine material than the remainder. This may be accomplished by screening the material through a screen of suitable mesh, as for example a 200 mesh or 100 mesh screen or by suspending the material in a moving stream of air or other gas and separately collecting the portions of different fineness as removed by settling, precipitation, bag-filtration or other separating means at different points in said gas stream. In this manner a portion of material may be obtained, amounting to say ½ to ⅕ of the entire material and being substantially free from the relatively large hard, low lime particles. Such portion may then be reduced to a materially finer state of division so as to convert a suitable proportion thereof to the form of impalpable powder, and the resulting material may then be added to the remainder of the normally ground material or to other cement material of substantially the fineness and composition of the material from which the portion to be finely ground was separated. By means of this latter method it is possible to produce a cement having sufficient impalpable powder to give the desired high early strength, but at the same time free from the objectionable fine material which is otherwise produced by fine division of the hard low lime particles, and which may tend to cause the quick setting to occur.

I claim:

1. A cementitious product possessing the combined properties of substantially normal setting time and higher early strength than similar cement material ground in the ordinary manner to the normal fineness of finished cement, said product comprising an intimate mixture of cement material of substantially the normal fineness of finished cement, and similar cement material ground separately to a materially greater fineness than said first-named material before mixing therewith.

2. A cementitious product possessing the combined properties of substantially normal setting time and higher early strength than similar cement material ground in the ordinary manner to the normal fineness of finished cement, said product comprising an intimate mixture of Portland cement of substantially the normal fineness of finished Portland cement, and additional Portland cement ground separately to a materially greater fineness than said first-named cement before mixing therewith.

3. A cementitious product possessing the combined properties of substantially normal setting time and higher early strength than similar cement material ground in the ordinary manner to the normal fineness of finished cement, said product comprising an intimate mixture of Portland cement ground to a fineness not exceeding 90% minus 200 mesh with an additional amount of Portland cement ground separately to a materially greater fineness than said first-named Portland cement.

4. A cementitious product possessing the combined properties of substantially normal setting time and higher early strength than similar cement material ground in the ordinary manner to the normal fineness of finished cement, said product comprising an intimate mixture of Portland cement ground to a fineness of less than 90% minus 200 mesh with an additional amount of Portland cement ground separately to a fineness of more than 94% minus 200 mesh.

5. A cementitious product possessing the combined properties of substantially normal setting time and higher early strength than similar cement material ground in the ordinary manner to the normal fineness of finished cement, said product comprising an intimate mixture of from 2 to 6 parts of Portland cement of substantially the normal fineness of finished cement and one part of Portland cement ground separately to a materally greater fineness than said first-named cement before mixing therewith.

6. A cementitious product possessing the combined properties of substantially normal setting time and higher early strength than similar cement material ground in the ordinary manner to the normal fineness of finished cement, said product comprising an intimate mixture of from 2 to 6 parts of ground Portland cement of a fineness of less than 90% minus 200 mesh and one part of separately ground Portland cement of a fineness of not less than 94% minus 200 mesh.

7. A cementitious product possessing the combined properties of substantially normal setting time and higher early strength than similar cement material ground in the ordinary manner to the normal fineness of finished cement, said product comprising cementitious material of a fineness of not less than about 90% minus 200 mesh and containing sufficient finely powdered material to produce high early strength and also containing a smaller proportion of material tending to produce quick setting than would be produced by simply grinding all of said cementitious material to the same fineness as said product, as expressed in percentage less than 200 mesh.

8. The method of making cementitious material comprising grinding a portion of cementitious material to substantially the normal fineness of finished cement, separately grinding another portion of similar cementitious material to a materially greater fineness than said first-named portions and then intimately mixing said portions together.

9. The method of making cementitious material comprising grinding a portion of Portland cement material to a fineness not exceeding 90% minus 200 mesh, separately grinding another portion of Portland cement material to a fineness materially in excess of 90% minus 200 mesh, and then intimately mixing said portions together.

10. The method of making cementitious material comprising intimately mixing together from 2 to 4 parts of Portland cement ground to substantially the normal fineness of finished Portland cement and one part of Portland cement which has been ground separately to a materially greater fineness than said first-named cement.

11. The method of making a cementitious product which comprises grinding a portion of cementitious material to a fineness of less than 90% minus 200 mesh, separating a portion of the material so ground from the remainder, grinding the portion so separated to a fineness materialy greater than 90% minus 200 mesh, and then mixing said finely ground portion with material of substantially the fineness and composition of that from which it was separated.

In testimony whereof I have hereunto subscribed my name this 27 day of May, 1927.

GUSTAV A. WITTE.